United States Patent Office 3,158,600
Patented Nov. 24, 1964

3,158,600
N-SUBSTITUTED 1,3-DIHYDRO-2H-AZEPIN-2-ONES
Leo A. Paquette, Portage Township, Kalamazoo County, Mich., assignor to The Upjohn Company, Kalamazoo, Mich., a corporation of Delaware
No Drawing. Filed Nov. 9, 1962, Ser. No. 236,715
6 Claims. (Cl. 260—239.3)

This invention relates to novel lactams and to processes for their preparation, and is more particularly concerned with novel N-substituted 1,3-dihydro-2H-azepin-2-ones of the formula:

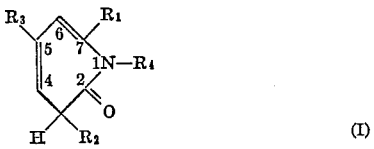

wherein $R_1$ and $R_2$ are alkyl of 1 to 4 carbon atoms, inclusive, and wherein $R_3$ is selected from the group consisting of hydrogen and alkyl of 1 to 4 carbon atoms, inclusive, and wherein $R_4$ is selected from the group consisting of alkyl of 1 to 6 carbon atoms, inclusive, alkenyl of 2 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive. $R_1$ and $R_2$ can be the same or different. When $R_3$ is alkyl, it can be the same as or different than $R_1$ or $R_2$. When $R_4$ is alkyl, it can be the same as or different than $R_1$, $R_2$, or $R_3$.

Examples of alkyl of 1 to 4 carbon atoms, inclusive, are methyl, ethyl, propyl, and butyl, and isomeric forms thereof. Examples of alkyl of 1 to 6 carbon atoms, inclusive, are methyl, ethyl, propyl, butyl, pentyl, and hexyl, and isomeric forms thereof. Examples of alkenyl of 2 to 6 carbon atoms, inclusive, are vinyl, allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, and the like. Examples of alkynyl of 3 to 6 carbon atoms, inclusive, are 2-propynyl (propargyl), 1-methyl-2-propynyl, 2-butynyl, 3-butynyl, 1-methyl-2-butynyl, 1-methyl-3-butynyl, 3-pentynyl, 1,2-dimethyl-3-butynyl, 4-pentynyl, 2-methyl-3-pentynyl, 3-hexynyl, and the like. Examples of cycloalkyl of 5 to 10 carbon atoms, inclusive, are cyclopentyl, cyclohexyl, 2-methyl-cyclopentyl, 2-methylcyclohexyl, 3-methylcyclohexyl, 4-methylcyclohexyl, 2-ethylcyclopentyl, 3-ethylcyclopentyl, 3-ethylcyclohexyl, 2-n-propylcyclopentyl, 3-isopropylcyclopentyl, 4-n-propylcyclohexyl, 2,3-dimethylcyclohexyl, 2-methyl-4-ethylcyclohexyl, cycloheptyl, 3-ethylcycloheptyl, cyclooctyl, 4-tert-butylcyclohexyl, 2,3-dimethylcyclooctyl, cyclononyl, cyclodecyl, and the like. Examples of aralkyl of 7 to 11 carbon atoms, inclusive, are benzyl, phenethyl, 2-phenylpropyl, 3-phenylpropyl, 4-phenylbutyl, 1-naphthylmethyl, 2-naphthylmethyl, and the like.

The novel N-substituted 1,3-dihydro-2H-azepin-2-ones of Formula I are useful for the treatment of topical fungal infections in mammals and other animals caused by fungi such as *Microsporum canis* and *Trichophyton rubrum*, or for eradicating such fungi from inanimate objects. Also, they are useful in the treatment of plant infections caused by such fungi as *Alternaria solani* and *Sclerotinia fructicola*. Further, these compounds are useful for treating *B. subtilis* infected breeding places of silkworms.

The novel N-substituted 1,3-dihydo-2H-azepin-2-ones of Formula I are also of value as intermediates in chemical synthesis. For example, reduction of the carbon-carbon double bonds, for example by hydrogenation in the presence of a noble metal catalyst such as platinum, followed by replacement of the carbonyl oxygen atom by two hydrogen atoms, for example by reduction with lithium aluminum hydride, produces the corresponding substituted hexahydroazepine. These cyclic amines form salts with thiocyanic acid which, condensed with formaldehyde, form resinous materials useful as pickling inhibitors according to U.S. Patents 2,425,320 and 2,606,155. These cyclic amines also form salts with fluosilicic acid which are useful as mothproofing agents according to U.S. Patents 1,915,334 and 2,075,359.

The novel N-substituted 1,3-dihydro-2H-azepin-2-ones of Formula I are also of value as monomers for the synthesis of useful polymeric materials. For example, an N-substituted 1,3-dihydro-2H-azepin-2-one of Formula I, particularly an N-vinyl-1,3-dihydro-2H-azepin-2-one, can be copolymerized with a major amount of another lactam, such as ε-caprolactam, to form a polyamide copolymer with desirable properties. Methods of preparing polyamide copolymers are generally known in the art (e.g., U.S. Patent 2,958,677). Preferably, a mixture of 9 to 9.5 parts by weight of ε-caprolactam and 0.5 to 1 part by weight of the N-vinyl-1,3-dihydro-2H-azepin-2-one is polymerized. Polyamides prepared in this manner have numerous molecular sites for cross-linking, for example by carbon bridges or disulfide bridges or both. Fibers drawn from such cross-linked polyamides have desirable wool-like properties.

The novel N-substituted 1,3-dihydro-2H-azepin-2-ones of Formula I are prepared by reacting a compound of the formula:

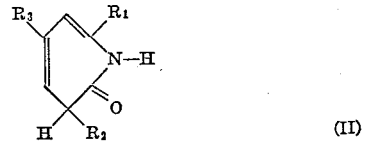

wherein $R_1$, $R_2$, and $R_3$ are as given above, first with a material selected from the group consisting of alkali metals, alkali metal hydrides, and alkali metal amides, and then with an organic halide of the formula $R_4X$, wherein X is a member selected from the group consisting of chloride, bromide, and iodide, and wherein $R_4$ is as given above.

The starting 1,3-dihydro-2H-azepin-2-one of Formula II is prepared by reacting an ethereal solution of chloramide ($ClNH_2$) with the sodium salt of a phenol of the formula:

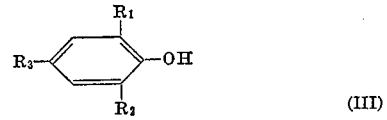

wherein $R_1$, $R_2$, and $R_3$ are as given above, in the presence of an additional quantity of the phenol. Reactants such as these have been interacted in a similar manner by Theilacker et al. [Angew. Chem. 72, 131 (1960)] but the reaction products were formulated by them as O-arylhydroxylamines.

Phenols of Formula III can be prepared by methods known in the art [e.g., U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem. 69, 699–706 (1957)]. Examples of phenols suitable for this reaction are 2,6-dimethylphenol (2,6-xylenol), 2,4,6-trimethylphenol (mesitol), 2,6-diethylphenol, 2,4,6-triethylphenol, 2,6-di-n-propylphenol, 2,6 - diisopropylphenol, 2,4,6 - triisopropylphenol, 2,6-diisobutylphenol, 2,4,6-tri-tert-butylphenol, 2-ethyl-6-methylphenol, 2-methyl-6-n-propylphenol, 2-ethyl-6-n-propylphenol, 2-tert-butyl-6-methylphenol, 2-sec-butyl-6-methylphenol, 2-tert-butyl-6-ethylphenol, 2-tert-butyl-6-isopropropylphenol, 2-isobutyl-6-n-propylphenol, 4-sec-butyl-2,6-dimethylphenol, 4-tert-butyl-2,6-dimethylphenol, 2,4-dimethyl-6-ethylphenol, 2,4-dimethyl-6-n-propylphenol, 6-tert-butyl-2,4-dimethylphenol, 2,6-diethyl-4-methylphenol, 2,6-diisopropyl-4-methylphenol, 2,4-di-tert-butyl-6-methylphenol, 2,6-di-tert-butyl-4-ethylphenol, 2,4-di-tert-butyl-6-n-propylphenol, 2,6 - diisobutyl-4-n-propylphenol, 2,6-di-tert-butyl-4-sec-butylphenol, 2-tert-butyl-4-ethyl - 6 - methylphenol, 2 - sec - butyl - 6 - isopropyl - 4 - methylphenol, 2-n-butyl-6-tert-butyl-4-methylphenol, and the like.

The first step in the prepartion of an N-substituted 1,3-dihydro-2H-azepin-2-one of Formula I is the reaction of the corresponding 1,3-dihydro-2H-azepin-2-one of Formula II with an alkali metal reactant such as an alkali metal, an alkali metal hydride, or an alkali metal amide. Examples of suitable alkali metal reactants are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformamide, N-methyl-pyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the organic reactant of Formula II. The alkali metal reactant and the Formula II compound are mixed and the reaction between them is carried out at temperatures which can vary from about 0° to about 150° C., preferably from about 25° to about 100° C. The most suitable temperature will of course depend upon such factors as the reactivities of the alkali metal reactant and the compound of Formula II, and the nature of the solvent. For example, relatively high reaction temperatures are usually necessary when using lithium reactants, and lower temperatures are preferred when using the more reactive materials such as potassium reactants. With the sodium reactants, for example, sodium hydride, reaction temperatures ranging from about 25° to about 100° C. are preferred but higher or lower temperatures can be used. It is preferred to react approximately equimolecular amounts of the 1,3-dihydro-2H-azepin-2-one of Formula II and the alkali metal reactant, although an excess of either reactant can be used. The time required for completing the reaction will depend on the reaction temperature, the reactivities of the two reactants, and the nature of the solvent. Illustratively, with sodium hydride, the reaction frequently requires about 15 minutes to about 3 hours at temperatures ranging from about 50° to about 100° C.

After the reaction between the alkali metal reactant and the 1,3-dihydro-2H-azepin-2-one of Formula II is complete, the metallo-organic reaction product can be isolated from the reaction mixture, for example, by removal of the solvent by evaporation or distillation, and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with an organic halide of formula $R_4X$ wherein X and $R_4$ are as given above. The organic bromides and iodides are preferred for this next step because of their greater reactivity, although the organic chlorides can be used and are advantageous in some instances because they are usually less expensive. Suitable organic bromides are methyl bromide, ethyl bromide, n-propyl bromide, isopropyl bromide, n-butyl bromide, sec-butyl bromide, isobutyl bromide, n-pentyl bromide, isopentyl bromide, 2-methylbutyl bromide, 1,2-dimethylpropyl bromide, 1-ethylpropyl bromide, 1-methylbutyl bromide, n-hexyl bromide, isohexyl bromide, 1-methylpentyl bromide, 1-ethylbutyl bromide, 2-methylpentyl bromide, 1,2-dimethylbutyl bromide, allyl bromide, 2-methylallyl bromide, 2-butenyl bromide, 3-butenyl bromide, 1,2-dimethylallyl bromide, 2-ethylallyl bromide, 1-methyl-2-butenyl bromide, 2-methyl-2-butenyl bromide, 3-methyl-2-butenyl bromide, 2,3-dimethyl-2-butenyl bromide, 1,3-dimethyl-2-butenyl bromide, 1-ethyl-2-butenyl bromide, 4-methyl-2-pentenyl bromide, 2-propynyl bromide, 2-butenyl bromide, 1-methyl-2-propynyl bromide, 3-butynyl bromide, 1-methyl-3-butynyl bromide, 3-pentynyl bromide, 4-pentynyl bromide, 3-hexynyl bromide, 2-methyl-3-pentynyl bromide, cyclopentyl bromide, cyclohexyl bromide, 2-methylcyclopentyl bromide, 2-methylcyclohexyl bromide, 3-methylcyclohexyl bromide, 4-methylcyclohexyl bromide, 2-ethylcyclopentyl bromide, 3-ethylcyclopentyl bromide, 4-ethylcyclohexyl bromide, 3-isopropylcyclopentyl bromide, 2,3-dimethylcyclohexyl bromide, cycloheptyl bromide, cyclooctyl bromide, 4-tert-butylcyclohexyl bromide, cyclononyl bromide, cyclodecyl bromide, benzyl bromide, phenethyl bromide, 2-phenylpropyl bromide, 3-phenylpropyl bromide, 4-phenylbutyl bromide, 1-naphthylmethyl bromide, 2-naphthylmethyl bromide, and the like. Suitable chlorides and iodides are those corresponding to the above bromides. These halides are either known in the art or can be prepared by methods known in the art, for example, by reaction of the corresponding alcohol with a phosphorus halide, by halogenation of a suitable saturated hydrocarbon, or by addition of a hydrogen halide to a suitable unsaturated hydrocarbon.

The organic halide is added to the metallo-organic reaction mixture either dropwise or in larger portions. Alternatively, the metallo-organic reaction mixture can be added in a similar manner to the organic halide. In either case, the organic halide can be dissolved in a suitable inert solvent, preferably in one or more of the solvents already present in the metallo-organic reaction mixture. Although only one molecular equivalent of the organic halide is required for reaction with one molecular equivalent of the metallo-organic reaction product (preferably calculated on the basis of the amount of 1,3-dihydro-2H-azepin-2-one of Formula II used to prepare the latter), it is preferred to use an excess of the organic halide, for example, about 1.1 to about 5 or even more molecular equivalents of the halide per molecular equivalent of the metallo-organic reaction product. Particularly preferred is the use of about 1.4 to about 2.0 molecular equivalents of organic halide per molecular equivalent of metallo-organic reaction product. Suitable reaction times and reaction temperatures for the interaction of organic halide and metallo-organic reaction product depend upon the nature of the reactants and the solvent, and the usual inverse relationship between time and temperature is observed. The organic iodides are the most reactive and the organic chlorides the least reactive. Suitable reaction temperatures range from about 0° to about 200° C., preferably from about 10° to about 75° C. Usually reaction temperatures ranging from about 25° to about 75° C. and reaction times ranging from about 1 to about 8 hours are satisfactory. The desired N-substituted, 1,3-dihydro-2H-azepin-2-one of Formula I can be isolated from the reaction mixture by conventional methods, for example, by removal of reaction solvent by evaporation or distillation.

If an alkali halide is present as a solid in the reaction mixture, it may with advantage be removed by filtration before the desired organic reaction product is isolated.

This aspect of the invention can be more fully understood by the following examples.

EXAMPLE 1

*Part A.—1,3-Dihydro-3,5,7-Trimethyl-2H-Azepin-2-One*

The sodium salt of 2,4,6-trimethylphenol in an excess of this phenol was reacted with chloramide, and an organic reaction product was isolated and purified, all by the method of Theilacker et al., supra. This organic reaction product was found to be 1,3-dihydro-3,5,7-trimethyl-2H-azepin-2-one; M.P. 132° C.

*Analysis.*—Calcd. for $C_9H_{13}NO$: C, 71.49; H, 8.67; N, 9.26. Found: C, 71.68; H, 8.47; N, 9.16. U.V. ($C_2H_5OH$), 252 m$\mu$ ($\epsilon$=6,050). I.R. (principal bands, mineral oil mull), 3200, 1695 cm.$^{-1}$.

*Part B.—1,3-Dihydro-1,3,5,7-Tetramethyl-2H-Azepin 2-One*

A 51.5% sodium hydride suspension in mineral oil (9.0 g.; equivalent to 0.19 mole of sodium hydride) was added to a solution of 1,3-dihydro-3,5,7-trimethyl-2H-azepin-2-one (29.0 g.; 0.19 mole) in 150 ml. of dimethylformamide. The mixture was stirred at 50° C. for 1 hour. After cooling, methyl iodide (42.6 g.; 0.30 mole) was added in two portions. After stirring for 1 hour, 250 ml. of diethyl ether was added and the resulting slurry was filtered. The oil remaining after evaporation of the solvent in the filtrate was distilled to yield 29.45 g. of a colorless liquid; B.P. 115–120° C. at 11 mm. Redistillation gave 1,3-dihydro-1,3,5,7-tetramethyl-2H-azepin-2-one-; B.P. 121.5° C. at 13 mm.; $n_D^{24}$ 1.5198.

*Analysis.*—Calcd. for $C_{10}H_{15}NO$: C, 72.69; H, 9.15; N, 8.48. Found: C, 72.32; H, 9.26; N, 8.59.

EXAMPLE 2

*1,3,5,7-Tetramethylhexahydroazepin-2-One*

1,3-dihydro-1,3,5,7-tetramethyl-2H-azepin-2-one (33.0 g.; 0.20 mole) was dissolved in 300 ml. of ethanol. After addition of platinum oxide catalyst (0.30 g.), the mixture was shaken at 25° C. with hydrogen at 2 atmospheres pressure until the uptake of hydrogen had ceased. Filtration and evaporation of the ethanol gave an oil which on distillation at reduced pressure gave 1,3,5,7-tetramethyl-hexadroazepin-2-one.

EXAMPLE 3

*1,2,4,6-Tetramethylhexahydroazepine*

1,3,5,7-tetramethylhexahydroazepin-2-one (16.9 g.; 0.10 mole) was added gradually during 25 minutes to a stirred slurry of lithium aluminum hydride (3.8 g.; 0.10 mole) in 150 ml. of diethyl ether at room temperature. The resulting mixture was refluxed in an atmosphere of nitrogen for 3 hours. The reaction mixture was then cooled externally with ice and treated successively with water (4 ml.), 30 percent aqueous sodium hydroxide solution (4 ml.), and water (12 ml.), each added dropwise with continued external cooling. The resulting solid was filtered and washed with ether, and the combined ether filtrate and washings were dried and concentrated to give an oil which on distillation at reduced pressure gave 1,2,4,6-tetramethylhexahydroazepine.

EXAMPLE 4

*1,3-Dihydro-1-Ethyl-3,5,7-Trimethyl-2H-Azepin-2-One*

A 51.5% sodium hydride suspension in mineral oil (3.1 g.; equivalent to 0.066 mole of sodium hydride) was added to a solution of 1,3-dihydro-3,5,7-trimethyl-2H-azepin-2-one (10.0 g.; 0.066 mole) in 50 ml. of dimethylformamide. The mixture was stirred at 50° C. for 1 hour. After cooling, ethyl bromide (10.9 g.; 0.10 mole) was added in two portions. After stirring for 1 hour, 250 ml. of diethyl ether was added and the resulting slurry was filtered. The oil remaining after evaporation of the solvent in the filtrate was distilled to yield 9.8 g. of colorless 1,3-dihydro-1-ethyl-3,5,7-trimethyl-2H-azepin-2-one; B.P. 115–119° C. at 11 mm.; $n_D^{25}$ 1.5070.

*Analysis.*—Calcd. for $C_{11}H_{17}NO$: C, 73.70; H, 9.56; N, 7.81. Found: C, 74.00; H, 9.70; N, 7.66. U.V. ($C_2H_5OH$), 253 m$\mu$ ($\epsilon$=4,750). I.R. (principal bands, mineral oil mull), 1667, 1608, 1240, 1207, 1127 cm.$^{-1}$.

Following the procedure of Example 1, Part A, but substituting for the
2,4,6-trimethylphenol, 2,6-dimethylphenol;
2,6-diethylphenol;
2,6-di-n-propylphenol;
2,6-diisopropylphenol;
2,6-diisobutylphenol;
2,6-di-n-butylphenol;
2,4,6-triethylphenol;
2,6-diethyl-4-methylphenol;
2,6-dimethyl-4-ethylphenol;
4-tert-butyl-2,6-dimethylphenol;
2,6-diisopropyl-4-methylphenol;
2,6-diisobutyl-4-n-propylphenol;
4-sec-butyl-2,6-dimethylphenol; and
2,4,6-triisopropylphenol,
there are obtained
1,3-dihydro-3,7-dimethyl-2H-azepin-2-one;
1,3-dihydro-3,7-diethyl-2H-azepin-2-one;
1,3-dihydro-3,7-di-n-propyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,7-di-n-butyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-n-propyl-2H-azepin-2-one;
1,3-dihydro-5-sec-butyl-3,7-dimethyl-2H-azepin-2-one; and
1,3-dihydro-3,5,7-triisopropyl-2H-azepin-2-one,
respectively.

Following the procedure of Example 1, Part B, but substituting for the methyl iodide, isopropylchloride;
n-propyl iodide;
isobutyl bromide;
n-pentyl bromide;
n-hexyl chloride;
allyl bromide;
2-methyl-2-butenyl bromide;
4-methyl-2-pentenyl chloride;
2-propynyl bromide;
3-pentynyl chloride;
cyclopentyl chloride;
cyclohexyl bromide;
4-tert-butylcyclo-hexyl chloride;
benzyl bromide; and
1-naphthylmethyl chloride,
there are obtained
1,3-dihydro-isopropyl-3,5,7-trimethyl-2H-azepin-2-one;
1,3-dihydro-1-n-propyl-3,5,7-trimethyl-2H-azepin-2-one;
1,3-dihydro-1-isobutyl-3,5,7-trimethyl-2H-azepine-2-one;
1,3-dihydro-1-n-pentyl-3,5,7-trimethyl-2H-azepin-2-one;
1,3-dihydro-1-n-hexyl-3,5,7-trimethyl-2H-azepin-2-one;
1,3-dihydro-1-allyl-3,5,7-trimethyl-2H-azepin-2-one;
1,3-dihydro-1-(2-methyl-2-butenyl)-3,5,7-trimethyl-2H-azepin-2-one;
1,3-diphydro-1-(4-methyl-2-pentenyl)-3,5,7-trimethyl-2H-azepin-2-one;
1,3-dihydro-1-(2-propynyl)-3,5,7-trimethyl-2H-azepin-2-one;
1,3-dihydro-1-(3-pentynyl)-3,5,7-trimethyl-2H-azepin-2-one;
1,3-dihydro-1-cyclopentyl-3,5,7-trimethyl-2H-azepin-2-one;

1,3-dihydro-1-cyclohexyl-3,5,7-trimethyl-
2H-azepin-2-one;
1,3-dihydro-1-(4-tert-butylcyclohexyl)-3,5,7-trimethyl-
2H-azepin-2-one;
1,3-dihydro-1-(1-naphthylmethyl)-3,5,7-trimethyl-
2H-azepin-2-one,
respectively.

Following the procedure of Example 1, Part B, but substituting for the combination of 1,3-dihydro-3,5,7-trimethyl-2H-azepin-2-one and methyl iodide as reactants,
1,3-dihydro-3,7-dimethyl-2H-azepin-2-one plus
isopropyl chloride;
1,3-dihydro-3,7-dimethyl-2H-azepin-2-one plus
cyclopentyl chloride;
1,3-dihydro-3,7-diethyl-2H-azepin-2-one plus
benzyl bromide;
1,3-dihydro-3,7-diethyl-2H-azepin-2-one plus
allyl bromide;
1,3-dihydro-3,7-di-n-propyl-2H-azepin-2-one plus
n-propyl iodide;
1,3-dihydro-3,7-diisopropyl-2H-azepin-2-one plus
4-tert-butylcyclohexyl chloride;
1,3-dihydro-3,7-diisobutyl-2H-azepin-2-one plus
n-propyl bromide;
1,3-dihydro-3,7-di-n-butyl-2H-azepin-2-one plus
n-pentyl bromide;
1,3-dihydro-3,5,7-triethyl-2H-azepin-2-one plus
2-propynyl bromide;
1,3-dihydro-3,7-diethyl-5-methyl-2H-azepin-2- one plus
benzyl bromide;
1,3-dihydro-3,7-dimethyl-5-ethyl-2H-azepin-2-one plus
n-hexyl chloride;
1,3-dihydro-5-tert-butyl-3,7-dimethyl-2H-azepin-2-one
plus 1-naphthylmethyl chloride;
1,3-dihydro-3,7-diisopropyl-5-methyl-2H-azepin-2-one
plus allyl bromide;
1,3-dihydro-3,7-diisobutyl-5-n-propyl-2H-azepin-2-one
plus n-propyl iodide;
1,3-dihydro-5-sec-butyl-3,7-dimethyl-2H-azepin-2-one
plus 2-propyl bromide; and
1,3-dihydro-3,5,7-triisopropyl-2H-azepin-2-one plus
isopropyl chloride, there are obtained 1,3-dihydro-3,7-dimethyl-1-isopropyl-2H-azepin-2-one;
1,3-dihydro-1-cyclopentyl-3,7-dimethyl-
2H-azepin-2-one;
1,3-dihydro-1-benzyl-3,7-diethyl-2H-azepin-2-one;
1,3-dihydro-1-allyl-3,7-diethyl-2H-azepin-2-one;
1,3-dihydro-1,3,7-tri-n-propyl-2H-azepin-2-one;
1,3-dihydro-1-(4-tert-butylcyclohexyl)-3,7-diisopropyl-
2H-azepin-2-one;
1,3-dihydro-3,7-diisobutyl-1-n-propyl-2H-azepin-2-one;
1,3-dihydro-3,7-di-n-butyl-1-n-pentyl-2H-azepin-2-one;
1,3-dihydro-1-(2-propynyl)-3,5,7-triethyl-2H-
azepin-2-one;
1,3-dihydro-1-benzyl-3,7-diethyl-5-methyl-2H-
azepin-2-one;
1,3-dihydro-3,7-dimethyl-5-ethyl-1-n-hexyl-
2H-azepin-2-one;
1,3-dihydro-5-tert-butyl-3,7-dimethyl-1-
(1-naphthylmethyl)-2H-azepin-2-one;
1,3-dihydro-1-allyl-3,7-diisopropyl-5-methyl-
2H-azepin-2-one;
1,3-dihydro-3,7-diisobutyl-1,5-di-n-propyl-
2H-azepin-2-one;
1,3-dihydro-5-sec-butyl-3,7-dimethyl-1-
(2-propynyl)-2H-azepin-2-one; and
1,3-dihydro-1,3,5,7-tetraisopropyl-2H-azepin-2-one,
respectively.

Alternative to the above procedure for preparing the novel N-substituted 1,3-dihydro-2H-azepin-2-ones of Formula I by first reacting the 1,3-hydro-2H-azepin-2-one of Formula II with an alkali metal reactant as defined above and subsequently reacting the resulting metallo-organic product with the organic halide of formula $R_4X$ as defined above, the three reactants, 1,3-dihydro-2H-azepin-2-one of Formula II, alkali metal reactant, and organic halide may be caused to be present simultaneously in the reaction vessel so that the metallo-organic product is further reacted with the organic halide as soon as the former is produced. However, this procedure is not as satisfactory with regard to yield and purity of the desired N-substituted 1,3-dihydro-2H-azepin-2-one of Formula I.

Because of the low reactivity of the halogen atoms in vinyl chloride, vinyl bromide, and vinyl iodide, it is inconvenient to prepare an N-substituted 1,3-dihydro-2H-azepin-2-one of Formula I by successive reaction of a 1,3-dihydro-2H-azepin-2-one of Formula II with an alkali metal, alkali metal hydride, or alkali metal amide and a vinyl halide. A 1,3-dihydro-2H-azepin-2-one of Formula II can be N-vinylated by reaction with an alkyl vinyl ether according to the general procedure of U.S. Patent 2,891,058 or by reaction with acetylene according to the general procedure of U.S. Patent 2,806,847.

EXAMPLE 5

*1,3-Dihydro-3,5,7-Trimethyl-1-Vinyl-2H-Azepin-2-One*

A mixture of 1,3-dihydro-3,5,7-trimethyl-2H-azepin-2-one (151 g.; 1.0 mole), ethyl vinyl ether (216 g.; 3.0 moles), and phenyl mercuric acetate (6.0 g.; 0.018 mole), heated in an autoclave under nitrogen at 145 to 155° C. for 9 hours, gave a reaction mixture which on fractional distillation yielded 1,3-dihydro-3,5,7-trimethyl-1-vinyl-2H-azepin-2-one.

Following the procedure of Example 5 but substituting for the 1,3-dihydro-3,5,7-trimethyl-2H-azepin-2-one,
1,3-dihydro-3,7-dimethyl-2H-azepin-2-one;
1,3-dihydro-3,7-diethyl-2H-azepin-2-one;
1,3-dihydro-3,7-di-n-propyl-2H-azepin-2-one;
1,3-dihydro-3,7-diethyl-5-methyl-2H-azepin-2-one;
1,3-dihydro-5-tert-butyl-3,7-dimethyl-2H-azepin-2-one;
and
1,3-dihydro-3,7-dimethyl-5-ethyl-2H-azepin-2-one, there are obtained 1,3-dihydro-3,7-dimethyl-1-vinyl-2H-azepin-2-one;
1,3-dihydro-3,7-diethyl-1-vinyl-2H-azepin-2-one;
1,3-dihydro-3,7-di-n-propyl-1-vinyl-2H-azepin-2-one;
1,3-dihydro-3,7-diethyl-5-methyl-1-vinyl-2H-
azepin-2-one;
1,3-dihydro-5-tert-butyl-3,7-dimethyl-1-vinyl-
2H-azepin-2-one; and
1,3-dihydro-3,7-dimethyl-5-ethyl-1-vinyl-
2H-azepin-2-one,
respectively.

EXAMPLE 6

*Copolymer of ε-Caprolactam and 1,3-Dihydro-3,5,7-Trimethyl-1-Vinyl-2H-Azepin-2-One*

ε-Caprolactam (113 g.; 1.0 mole) and 1,3-dihydro-3,5,7-trimethyl-1-vinyl-2H-azepin-2-one (8.9 g.; 0.05 mole) were mixed in an autoclave with glacial acetic acid (1.0 g.) and water (80 g.). The autoclave was closed, purged with nitrogen, and heated at 230–250° C. for 3 hours. The autoclave was then opened slowly to the atmosphere and heating was continued for one hour at 230–250° C. The resulting hard polymeric material can be purified and transformed into useful articles such as fibers, with or without further reactions to induce cross-linking of the polymeric chains, by methods known to the art.

Certain of the novel N-substituted 1,3-dihydro-2H-azepin-2-ones of Formula I, more particularly those compounds of Formula I in which $R_4$ is alkyl, are also prepared by reacting an alkali metal salt of a phenol of the formula:

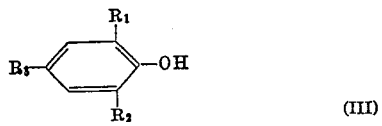

wherein $R_1$, $R_2$, and $R_3$ are as given above, with an N-chloroalkylamine of the formula:

wherein $R_5$ is alkyl of 1 to 6 carbon atoms, inclusive. Examples of alkyl of 1 to 6 carbon atoms, inclusive, are methyl, ethyl, propyl, butyl, pentyl, and hexyl, and isomeric forms thereof.

As mentioned above, phenols of Formula III can be prepared by methods known in the art. Examples of phenols suitable for this reaction are all of those specifically mentioned above.

The phenol of Formula III is transformed to the alkali metal salt by reaction with an alkali metal, for example, lithium, sodium, or potassium, or with an alkali metal base of sufficient basicity to react with the acidic hydrogen of the phenol. Examples of suitable alkali metal bases are the hydroxides, for example, lithium hydroxide, sodium hydroxide, and potassium hydroxide, and the alkoxides, for example, lithium methoxide, sodium methoxide, potassium methoxide, as well as other corresponding alkoxides such as the ethoxides, n-propoxides, isopropoxides, n-butoxides, tert-butoxides, and the like. Of these alkali metals and alkali metal bases, sodium metal and the sodium bases are preferred because they are relatively inexpensive and of particularly suitable reactivity for this purpose, and because the sodium phenoxides are of particularly suitable reactivity for the reaction with the N-chloroalkylamine. Sodium metal is particularly preferred for this purpose.

The alkali metal phenoxides are prepared by mixing the phenol of Formula III and the alkali metal or alkali metal base. Although an additional solvent such as a hydrocarbon or an ether unreactive toward the alkali metal or alkali metal base can be used in this reaction, such a solvent is usually unnecessary and its absence is preferred. It is also preferred to use more than one molecular equivalent of the phenol per atomic equivalent of the alkali metal or molecular equivalent of the alkali metal base, and to allow the excess phenol to serve as a solvent for the subsequent reaction with the N-chloroalkylamine. It is especially advantageous to do this when the alkali metal is used to prepare the alkali metal phenoxide. Suitable reaction conditions in this regard include about 1.5 to about 20 or even more molecular equivalents of the phenol per equivalent of the alkali metal or the alkali metal base. Particularly preferred is the use of about 3 to about 6 molecular equivalents of the phenol per equivalent of the alkali metal or alkali metal base. It is advantageous to heat the phenol to its melting point or above that temperature so that the reaction mixture can be stirred more easily and the salt-forming reaction encouraged.

N-chloroalkylamines of Formula IV can be prepared by methods known in the art [e.g., Coleman, J. Am. Chem. Soc. 55, 3001–5 (1933)]. Examples of N-chloroalkylamines suitable for this reaction are N-chloromethylamine, N-chloroethylamine, N-chloro-n-propylamine, N-chloroisopropylamine, N-chloro-n-butylamine, N-chloroisobutylamine, N-chloro-tert-butylamine, N-chloro-n-pentylamine, N-chloroisopentylamine, N-chloro-2-methylbutylamine, N-chloroneopentylamine, N-chloro-1,2-dimethylpropylamine, N-chloro-1-ethylpropylamine, N-chloro-1-methylbutylamine, N-chloro-n-hexylamine, N-chloroisohexylamine, N-chloro-1-methylpentylamine, N-chloro-1-ethylbutylamine, N-chloro-2-methylpentylamine, N-chloro-1,2-dimethylbutylamine, N-chloro-2,2-dimethylbutylamine, and the like. Although Coleman, supra, discloses only the production of ethereal solutions of N-chloroaklylamines, solutions of N-chloroalkylamines in other solvents, for example, pentane, can be prepared and reacted with the alkali metal salt of a phenol of Formula III. The important criterion in the choice of a solvent for the N-chloroalkylamine is unreactivity toward the N-chloroalkylamine and toward the alkali metal phenoxide with which the N-chloroalkylamine is to be reacted. It is also preferred that the N-chloro-alkylamine solvent have a boiling point sufficiently low so that it vaporizes rapidly during reaction of the N-chloroalkylamine with the alkali metal phenoxide. Diethyl ether is preferred as an N-chloroalkylamine solvent. It is not advantageous to isolate the N-chloroalkylamine from the solvent used in its preparation.

The N-alkyl-1,3-dihydro-2H-azepin-2-one of Formula I is prepared by mixing the N-chloroalkylamine solution and the alkali metal phenoxide. This is preferably done by adding the N-chloroalkylamine solution, preferably below 25° C., gradually to a stirred mixture of alkali metal phenoxide in additional phenol at a temperature above the melting point of the phenol. Suitable reaction temperatures range from the melting point of the phenol up to about 250° C., preferably, about 100° to about 175° C. If the phenol does not have an appropriate melting point, an inert solvent, for example, a hydrocarbon such as toluene, xylene, cumene, tetrahydronaphthalene, octane, mineral oil, or the like, or an ether, for example, dioxane, dialkyl ethers of ethylene glycol, dialkyl ethers of diethylene glycol, or the like, can be present in the reaction mixture to cause the latter to be substantially fluid in the desired reaction temperature range. Although one molecular equivalent of the N-chloroalkylamine is theoretically required for reaction with the alkali metal phenoxide, it is preferred to use somewhat less N-chloroalkylamine than alkali metal phenoxide (based upon the amount of alkali metal or alkali metal base used to prepare the latter). For example, about 1.1 to about 2.0 moles of alkali metal phenoxide per mole of N-chloroalkylamine is preferred. The reaction between alkali metal phenoxide and N-chloroalkylamine usually takes place rapidly and, after addition of the latter to the coaction mixture is complete, it is usually sufficent to continue heating the reaction mixture, as during the addition, for say 10 to 60 minutes, although a longer reaction time may be required for some combinations of reactants. When the reaction is complete, it is preferred to remove any excess phenol, preferably by distillation, directly from the reaction mixture at reduced pressure. The residue is then cooled and the resulting desired N-alkyl-1,3-dihydro-2H-azepin-2-one is isolated by conventional techniques, for example by partition of any excess alkali metal phenoxide and the desired N-alkyl-1,3-dihydro-2H-azepin-2-one between diethyl ether and water. The N-alkyl-1,3-dihydro-2H-azepin-2-one can be purified by conventional techniques, for example, by fractional distillation or vapor phase chromatography.

This aspect of the invention can be more fully understood by the following examples.

EXAMPLE 7

*1,3-Dihydro-1,3,7-Trimethyl-2H-Azepin-2-One*

Sodium metal (6.9 g., 0.30 gram atom) in small pieces was added to 2,6-dimethylphenol (150 g.; 1.23 moles) with stirring above its melting point (49° C.). When the reaction was complete, a solution of N-chloromethylamine (16.4 g.; 0.25 mole) in 250 ml. of diethyl ether at −70° C. was added in a thin stream to the phenolphenoxide mixture with stirring at 120° to 140° C. After an additional 15 minutes of heating and stirring, the reaction mixture was cooled to about 100° C. and excess 2,6-dimethylphenol was removed by distillation at 13 mm. pressure. The residue was cooled to about 25° C. and treated with a mixture of diethyl ether and water. The aqueous layer was separated and extracted with additional diethyl ether. The combined ethereal layers were dried and evaporated, and the residue was distilled, giving 7.1 g. of a pale yellow oil; B.P. 109–115° C. at 13 mm. Purification of this oil by vapor phase chromatography (225° C.; helium gas as a carrier; a cross-linked diethylene glycol adipate polymer as a column liquid), followed by evaporative distillation at 13 mm. gave colorless 1,3-dihydro-1,3,7-trimethyl-2H-azepin-2-one.

*Analysis.*—Calcd. for $C_9H_{13}NO$: C, 71.49; H, 8.67; N, 9.26. Found: C, 71.04; H, 8.71; N, 8.98.

EXAMPLE 8

*1,3-Dihydro-1,3,5,7-Tetramethyl-2H-Azepin-2-One*

The procedure of Example 7 was followed except that in place of the 2,6-dimethylphenol, there was used 2,4,6-trimethylphenol (167 g.; 1.23 moles). There was obtained 14.5 g. of a pale yellow liquid; B.P. 118–122° C. at 12 mm. Redistillation gave 1,3-dihydro-1,3,5,7-tetramethyl-2H-azepin-2-one; B.P. 121–122° C. at 12 mm.

Following the procedure of Example 7 but substituting for the combination of 2,6-dimethylphenol and N-chloromethylamine as reactants, 2,6-dimethylphenol and N-chloroethylamine; 2,6-diethylphenol and N-chloromethylamine; 2,6-diisopropylphenol and N-chloroisopropylamine; 2,4,6-triethylphenol and N-chloroethylamine; 2,6-diethyl-4-methylphenol and N-chloro-n-propylamine; 4-tert-butyl-2,6-dimethylphenol and N-chloro-tert-butylamine; 2,4,6-trimethylphenol and N-chloro-n-hexylamine; 2,6-dimethyl-4-ethylphenol and N-chloroisopentylamine; 2,6-di-n-butylphenol and N-chloro-n-butylamine; and 2,4,6-triisopropylphenol and N-chloromethylamine, there are obtained 1,3-dihydro-3,7-dimethyl-1-ethyl-2H-azepin-2-one;
1,3-dihydro-3,7-diethyl-1-methyl-2H-azepin-2-one;
1,3-dihydro-1,3,7-triisopropyl-2H-azepin-2-one;
1,3-dihydro-1,3,5,7-tetraethyl-2H-azepin-2-one;
1,3-dihydro-3,7-diethyl-5-methyl-1-n-propyl-2H-azepin-2-one;
1,3-dihydro-1,5-di-tert-butyl-3,7-dimethyl-2H-azepin-2-one;
1,3-dihydro-1-n-hexyl-3,5,7-trimethyl-2H-azepin-2-one;
1,3-dihydro-3,7-dimethyl-5-ethyl-1-isopentyl-2H-azepin-2-one;
1,3-dihydro-1,3,7-tri-n-butyl-2H-azepin-2-one; and
1,3-dihydro-1-methyl-3,5,7-triisopropyl-2H-azepin-2-one, respectively.

I claim:

1. A compound of the formula:

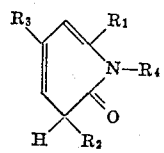

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of alkyl of 1 to 6 carbon atoms, inclusive, alkenyl of 2 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive.

2. 1,3-dihydro-1,3,7-trimethyl-2H-azepin-2-one.

3. 1,3-dihydro-1,3,5,7-tetramethyl-2H-azepin-2-one.
4. 1,3-dihydro-1-ethyl-3,5,7-trimethyl-2H-azepin-2-one.
5. A process for the preparation of an N-substituted 1,3-dihydro-2H-azepin-2-one of the formula:

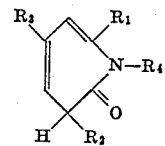

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive, which comprises the steps, (1) mixing a compound of the formula:

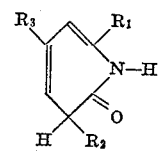

wherein $R_1$, $R_2$, and $R_3$ are as given above, with a material selected from the group consisting of alkali metals, alkali metal hydrides, and alkali metal amides, and (2) mixing the metallo-organic reaction product from step (1) with a compound of the formula:

$$R_4X$$

wherein X is a member selected from the group consisting of chloride, bromide, and iodide, and wherein $R_4$ is as given above, to form said N-substituted 1,3-dihydro-2H-azepin-2-one.

6. A process for the preparation of an N-substituted 1,3-dihydro-2H-azepin-2-one of the formula:

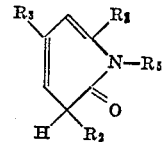

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_5$ is alkyl of 1 to 6 carbon atoms, inclusive, which comprises mixing an alkali metal salt of a compound of the formula:

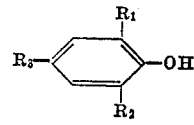

wherein $R_1$, $R_2$, and $R_3$ are as given above, with a compound of the formula:

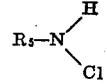

wherein $R_5$ is as given above, to form said N-substituted 1,3-dihydro-2H-azepin-2-one.

No references cited.